United States Patent
Basso et al.

(10) Patent No.: US 6,675,221 B1
(45) Date of Patent: Jan. 6, 2004

(54) METHOD AND APPARATUS FOR CUSTOMIZING AND FOWARDING PARAMETERS IN A NETWORK PROCESSOR

(75) Inventors: Claude Basso, Raleigh, NC (US); Natarajan Vaidhyanathan, Durham, NC (US); Gail Irene Woodland, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/544,588

(22) Filed: Apr. 6, 2000

(51) Int. Cl.[7] .............................................. G06F 15/16
(52) U.S. Cl. ...................... 709/232; 709/200; 709/201; 709/213; 709/233; 709/250; 370/230; 370/235; 370/254
(58) Field of Search ................................ 709/200, 201, 709/213, 223, 250, 232; 370/230, 235, 254

(56) References Cited

U.S. PATENT DOCUMENTS

| | | | |
|---|---|---|---|
| 5,485,460 A | 1/1996 | Schrier et al. ............. 370/94.1 |
| 5,570,084 A | 10/1996 | Ritter et al. ........... 340/825.05 |
| 5,734,830 A | 3/1998 | Balogh et al. ......... 395/200.38 |
| 6,272,522 B1 | * 8/2001 | Lin et al. ..................... 709/200 |
| 6,424,621 B1 | * 7/2002 | Ramaswamy et al. ...... 370/230 |
| 6,426,944 B1 | * 7/2002 | Moore ......................... 370/236 |
| 6,473,434 B1 | * 10/2002 | Araya et al. ................. 370/412 |

OTHER PUBLICATIONS

James Awaya, "One the design of IP routers Part 1: Router architectures" 483–511, Journal of Systems and Architecture, vol. 46, No. 6, Apr. 2000, XP004190486.
PCT International Search Report dated Feb. 14, 2000.

* cited by examiner

Primary Examiner—Zarni Maung
Assistant Examiner—Jinsong Hu
(74) Attorney, Agent, or Firm—Scully, Scott, Murphy & Presser

(57) ABSTRACT

In a distributed networking environment employing several general purpose processors (i.e., control point processors) for controlling one or more network processor devices, a mechanism for distributing processing across several general purpose processors and interface for configuring a network processor so that specific general purpose processors handle specific operations in a large networking environment, thus, reducing requirement for provisioning a plurality of protocol stacks on each general purpose processor.

9 Claims, 2 Drawing Sheets

METHOD AND APPARATUS FOR CUSTOMIZING AND FOWARDING PARAMETERS IN A NETWORK PROCESSOR

BACKGROUND OF THE INVENTION

1. Field of the Invention

This invention relates generally to network processor devices, and more specifically, to a mechanism for distributing processing across several general purpose processors (i.e., control point processors) and for configuring a network processor so that specific general purpose processors handle specific operations in a large networking environment.

2. Discussion of the Prior Art

FIG. 1 depicts a typical networking configuration 10 including a single General Purpose Processor (GPP) control device 15 controlling many network processor devices 25a, ..., 25n. A processing bottleneck is often created in the system 10 at the GPP since the GPP handles all special frames (i.e., PPP control frames or unknown frames).

FIG. 2 illustrates a more distributed networking configuration implementing multiple General Purpose Processor control devices 15a, ..., 15n. In this configuration, in order for a network processor to forward a special frame type to a GPP for processing, each GPP requires protocol stacks for each protocol it must handle since the network processors are not able to decipher how to send a special frame to a specific GPP. A requirement that each GPP have a complete protocol stack for each protocol handled by the Network Processor increases memory requirements and lowers performance.

It would thus be desirable to provide a GPP configuration in a distributed networking environment that obviates the need for provisioning a complete set of protocol stacks for each GPP device.

SUMMARY OF THE INVENTION

It is an object of the present invention to provide a mechanism for configuring GPPs in a distributed networking environment to handle specific special frame types and to provide the capability of distributing special frame types to a specific, configured GPP by a network processor.

It is a further object of the present invention to provide an Application Program Interface (API) and method for distributing processing across several general purpose processors (i.e., control point processors) and enabling a network processor to configure which processor handles specific operations.

According to the invention, there is provided a system and method for distributing processing of special data frames received by a network processor (NP) device in a distributed networking environment comprising one or more general purpose control processors (GPP) that control one or more NP devices, the system comprising a configurable table implemented in the NP device for mapping special data frame types received at the NP device with a target address and a target port address associated with a target GPP capable of handling the special frame type, wherein the NP network processor includes mechanism for classifying the received data frames and comparing each frame to entries in the configurable table. The network processing device then forwards the frame to the target GPP provisioned for handling the special data frame type, through a corresponding target port address.

This invention is additionally directed to an application programming interface for configuring the network processor (NP) device operating in a distributed networking environment that includes one or more general purpose control processors (GPP) for controlling one or more NP devices. The interface comprises a mechanism for generating a data structure for input to the NP device, the data structure having one or more entries specifying a special frame type and an associated target address and target port address associated with a GPP capable of handling the frame protocol type; and, a device for generating a customized table from the generated data structure, and inputting the customized table to an NP device memory. The NP device includes a mechanism for identifying a frame type and performing a customized table lookup for redirecting or forwarding the special frame type to an associated GPP through the target port address.

Advantageously, such a method enables a network processor to distribute processing across several general purpose processors (i.e., control point processors) and enables the capability to configure which processor handles specific operations in a large networking environment thus reducing the number of protocol stacks that need to be maintained on each general purpose control processor.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENT

Figure 1:
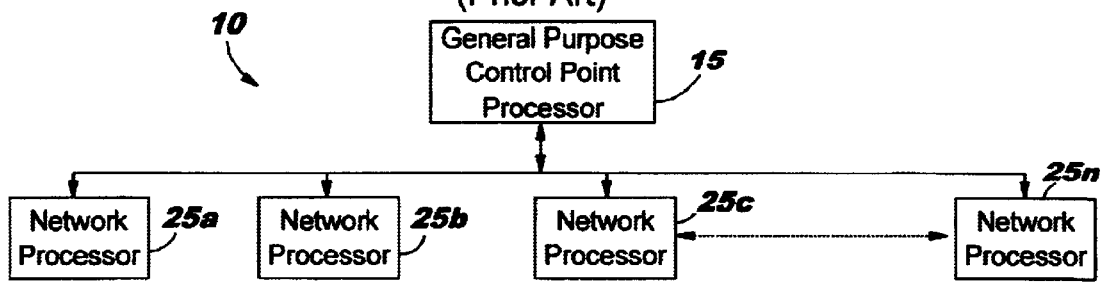
FIG. 1 is a general block diagram of a distributed network processing environment including a plurality of network processing devices controlled by a single general purpose processor (GPP) device.
Figure 2:
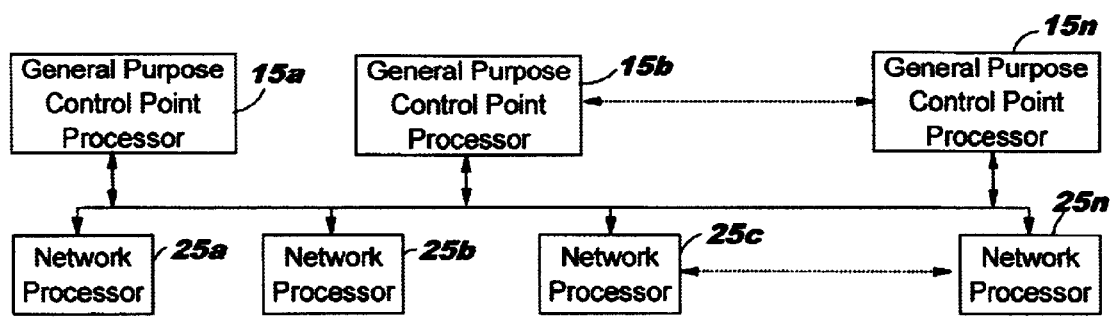
FIG. 2 is a general block diagram of a distributed network processing environment including a plurality of network processing devices controlled by multiple general purpose processor (GPP) devices.

The present invention is directed to an application program interface (API) which is implemented by a General Purpose Processor (GPP) control device operating in a distributed networking environment (e.g., external GPP, embedded GPP in network processor, etc.) for enabling the customization and configuration of network processor (NP) devices so that they may handle the forwarding of special data packets (frame) types. For exemplary purposes, reference is made to one networking processor-based device and system such as described in commonly-owned, co-pending U.S. patent application Ser. No. 09/384,691 filed Aug. 27, 1999 and entitled "NETWORK PROCESSOR PROCESSING COMPLEX AND METHODS", the whole contents and disclosure of which is incorporated by reference as if fully set forth herein.

However, the invention may be employed in other network processor-based devices of various hardware/software designs.

Generally, as described in herein incorporated, co-pending U.S. patent application Ser. No. 09/384,691, the general flow of a data frame received at a NP device is as follows. Frames received from an network connection, e.g., Ethernet MAC, are identified as either normal data frames or system control frames (Guided Frames). In the context of the invention, frames identified as normal data frames are enqueued to an Embedded Processor Complex (EPC) which comprises a plurality of picoprocessors, e.g., protocol processors, which execute logic (picocode) capable of looking at the received frame header and deciding what to do with the frame (forward, modify, filter, etc.). The EPC has access to several lookup tables, and classification hardware assists to allow the picoprocessors to keep up with the high-bandwidth requirements of the Network Processor. A classification hardware assist device in particular, is provided for classifying frames of well known frame formats. The Embedded Processing Complex (EPC) particularly provides and controls the programmability of the NP device chip and includes, among other components (such as memory, dispatcher, interfaces), one or more processing units which concurrently execute picocode that is stored in a common instruction memory. Each processing unit preferably includes a Processing Unit core, for example, comprising a 3-stage pipeline, general purpose registers and an ALU. In operation, classification results from the classification hardware assist device are passed to a one or more processing unit during frame dispatch. One processing unit, in particular, referred to as a General Data Handler (GDH) comprises a full processing unit and one or more co-processing devices primarily used for forwarding frames according to the invention.

The API of the invention, in particular, is used by a GPP to configure parameters which affect where picocode executing at a particular network processor sends certain packet types. This API allows an end user to configure a customizable table that cross-references special frame types with a target GPP provisioned for handling the corresponding special frames. In this manner, the requirement of provisioning a protocol stack in each GPP is avoided.

Figure 3:
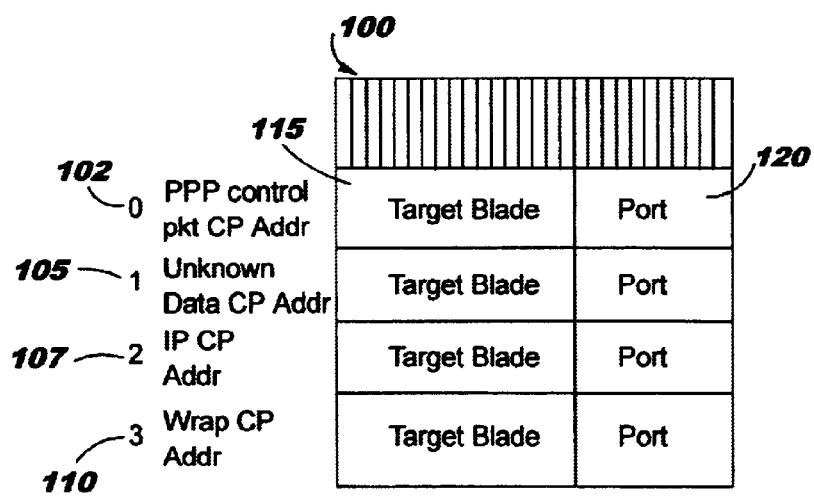
FIG. 3 illustrates an example customizable table 100 for forwarding the special frame types according to the present invention.

FIG. 3 depicts an example customizable table 100 for forwarding the special frame types to a pre-specified GPP via the API. In the preferred embodiment, the customizable table 100 is a flat table configured in NP device memory and includes entries corresponding to classified special frame types including, but not limited to: a Point-to-point (PPP) control type 102, unknown data frame types 105 (i.e., frames of a protocol not understood by the NP device), IP frame types 107, and Wrap type 110 frames (i.e., frames received from a switch fabric at an egress side of the NP). It is understood that additional special frame types, e.g., layer 3 protocols, may be mapped for particular GPPs destinations in the customized table depicted in FIG. 3. It is further understood that if the customized table 100 is of a larger size having many frame type entries, it may be configured in the form of a tree to facilitate table lookup. For each frame classified as a special frame type, there is a corresponding entry provided that includes: a target "blade" address 115, i.e., the address of the printed circuit board element associated with the destination GPP for handling the special frame type; and, a port address 120 of the NP device that connects to the destination GPP. It is understood that the table 100 may include additional mapping data as well.

In the preferred embodiment, the customizable table 100 is downloaded from the GPP to each network processor 125a, ..., 125n in the system 100 via the API. What follows is an example API implemented for configuring the flat table:

```
/******************************************************
* np_ims_customizedParms_configure( )
* INPUTS:
* number_TLVs - number of TLVs that will be included
* in the *tlv parameter
* tlv - pointer to a string of Tagged List
* Values (TLVs). Each TLV takes the
* form:
* +-----+-----+-----------
* | Attr# | length | Value. . . .
* +-----+-----+-----------
* Attr# - two octets attribute number
* describing stored value. See
* np_types.h for possible
* NP_ATTRNUM_'s.
* length - two octets TLV length which
* includes the length of the
* Attr# and length fields.
* Value - variable length field containing
* stored value
* ctrl_info - control information specifying the
* expected asynch response characteristics
* OUTPUTS:
* none
* RETURN VALUE:
* np_return_code_t-
* NP_RC_NOT_READY - IMS was not properly initialized
* NP_RC_BADPARMS - Bad parameter passed
* NP_RC_MISCERR - An error occurred during config
* NP_RC_SUCCESS
* ASYN RESPONSE:
* This API will provide an asynchronous command completion
* response as specified in the np_msg_ctrl_info_s param.
* DESCRIPTION:
* This API is used to configure the customized parameters
* to direct picocode on where to send PPP control packets,
* IP packets, and unknown data packets (e.g., data
* protocols other than PPP, IP, etc.).
* The following TLVs are valid for this API:
* NP_ATTRNUM_PPPCONTROL_ADDR: 2 bytes NP + 2 bytes port
* NP_ATTRNUM_IP_ADDR: 2 bytes NP + 2 bytes port
* NP_ATTRNUM_UNKNOWN_DATA_ADDR: 2 bytes NP + 2 bytes
* port
* NP_ATTRNUM_WRAP_ADDR: 2 bytes NP + 2 bytes port
*******************************************************/
np_return_code_t np_ims_customizedParms_configure(
            np_unit32number-TLVs,
            np_TLV_s*tlv,
            np_msg_ctrl_info_s ctrl_info);
```

The foregoing example API is now described in greater detail as follows: Specifically, the API implements a procedure call np_ims_customizedParms_configure, which may be executed in the C/C++ language, for receiving user-specified parameters for configuring the customized table of FIG. 3. The parameters include: for example, a np_unit32number-TLVs input, which input represents the number of tagged list values (TLVs) provided in a TLV list, and provides an initialization of the number of special frame types that are to be configured in the table; a np_TLV_s*tlv input which input represents a pointer to a string of TLV values; and, a np_msg_ctrl_info_s ctrl_info input which input represents control information for an asynchronous system response, such as, a notification that the API has finished customizing the table for the NP. With reference to the TLV value string, each string is of the above-identified form

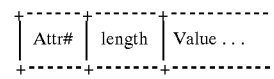

where Attr# represents an attribute number (one or more octets) describing the particular protocol that is to be configured, e.g., PPP protocol; length represents the physical length of the value; and Value represents the actual value of the protocol frame type and comprises an amount of bytes, e.g., two bytes, representing the NP "blade" address and another amount of bytes (e.g., two bytes) representing the NP port associated with the target GPP. These values are downloaded for storage in a variable length field. A header file np_types.h may be referenced for retrieving the possible number of TLVs and, in correspondence with the customized table of FIG. 3, include NP_ATTRNUM_'s including two byte NP address+two byte port address such as: NP_ATTRNUM_PPPCONTROL_ADDR, NP_ATTRNUM_IP_ADDR, NP_ATTRNUM_UNKNOWN_DATA_ADDR, and NP_ATTRNUM_WRAP_ADDR. Other data configured for download via the API include control information for specifying any expected asynchronous response characteristics, such as, for example, a notification via the API that each of the NPs in the network have been configured with the customized table. A return parameter of the API referred to as np_return_code_t, for example, returns values such as: NP_RC_NOT_READY for indicating that a particular sub-system was not properly initialized; NP_RC_BADPARMS for indicating that a bad parameter was passed; NP_RC_MISCERR for indicating that an error occurred during table configuration; and, NP_RC_SUCCESS for indicating that the NP configuration was successful.

Having configured the EPC of each network processor in the distributed network, the process 200 of distributing processing across the several general purpose processors is now described with reference to FIG. 4.

Figure 4:
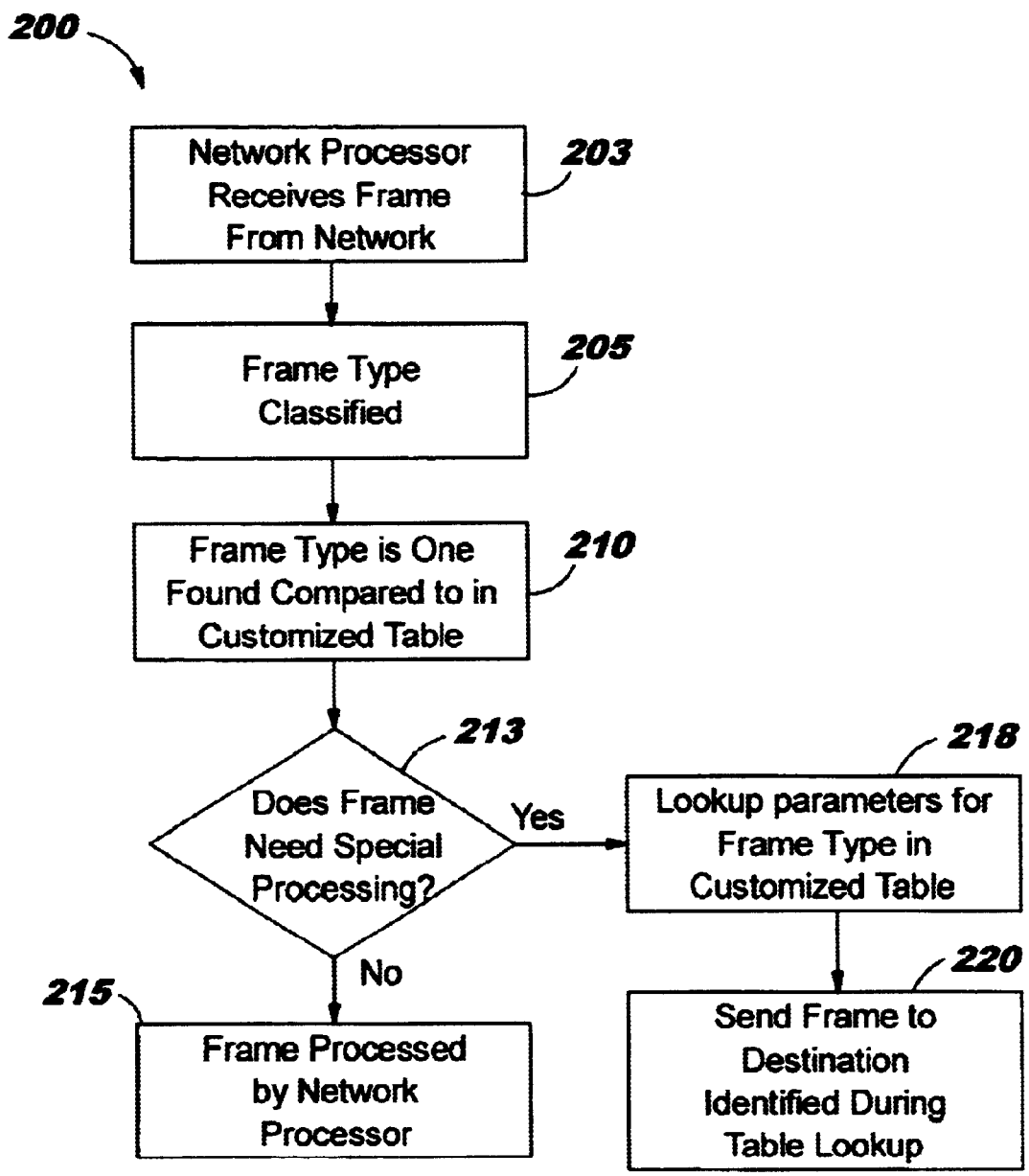
FIG. 4 illustrates the process 200 of distributing processing across several general purpose processors according to the present invention.

As shown in FIG. 4, there is depicted a first processing step 203 which depicts a network processor receiving a frame from the network. At step 205, the received frame type is classified by a hardware classifier of the network processor device and the frame is forwarded to the picocode executing in the GDH. If the hardware classifier was not able to classify the frame, the picocode classifies it. Based on the classification, at step 210, the picocode executes logic for performing a lookup into the customized table 100 (e.g., FIG. 3) loaded in the data store of a network processor. It is understood that the frame type is used as an index into the table 100. Then, at step 213, a determination is made as to whether a match exists, i.e., whether the frame is to be forwarded to a specific GPP for special processing based on its frame type. If no match exists (i.e., no special processing is required), the network processor processes the frame at step 215. If, at step 213, it is determined that a match exists, the lookup is performed in the customized table 100 to determine the target GPP address and port address for that frame type at step 218 and, the special frame is forwarded to the appropriate GPP at step 220 using those parameters. The processing described with respect to FIG. 4 results in four possible outcomes: 1) the packet is forwarded for processing in the network processor; 2) the packet is redirected to a GPP for processing; 3) the packet is dropped; and 4) the packet is dropped and an unsolicited message is sent to the GPP.

An example using the methodology of the invention depicted in FIG. 4 is now described for the case involving processing of a Point-to-Point Protocol (PPP) frame. The PPP frame is processed by the network processor. If the frame is a PPP control frame, it is forwarded to the configured GPP based on the customized lookup table (FIG. 3). If the frame is a Layer 3 frame, the Layer 2 network processor picocode forwards it to the appropriate network processor component. If the Layer 3 protocol is not handled by picocode, the frame is forwarded to the configured GPP for that protocol as specified in the lookup table. If the protocol has not been enabled, the frame is enqueued to a discard queue, not shown. If the frame is not a recognized Layer 3 frame and the discard unknown PPP frame is configured, it is enqueued to the discard queue. Otherwise, the frame is forwarded to the configured GPP for unknown PPP frames as specified in the lookup table.

Exemplary actions taken are summarized in the following Table:

| Protocol | Action |
|---|---|
| PPP Control frame | Redirect to configured GPP |
| IP | Proceed to NP IP Layer 3 if IP enabled in PCT |
| Unknown | Redirect to configured GPP (Unknown Data) if the unknown PPP frame is not set in the PCT. |

It is understood that by enabling a network processor to distribute processing across several general purpose processors in accordance with the invention, and providing the capability of configuring which NP handles specific operations in a large networking environment, advantageously results in the requirement of fewer protocol stacks on each general purpose processor, as each GPP will be equipped to handle only those special frames forwarded by the NP in accordance with the customizable table exemplified in FIG. 3.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A system for distributing processing of special data frames received by a network processor (NP) device in a distributed networking environment comprising one or more general purpose control processors (GPP) that control one or more NP devices, said system comprising;
    a configurable table implemented in said NP device for mapping special data frame types received at said NP device with a target address and a target port address associated with a target GPP capable of handling said special frame type;
    an application programming interface for customizing said configurable table in said NP device with said target address and target port address entries through said GPP,
    wherein said NP device includes mechanism for classifying the received data frames and comparing each said frame to entries in said configurable table, and if said classified frame type has a corresponding entry in said table, said NP device forwarding said frame to said target GPP through a corresponding target port address, wherein said target GPP is provisioned for handling forwarding of said special data frame type.

2. The system according to claim 1, wherein a special data frames type includes a data frame of a protocol unrecognized by said NP device.

3. The system according to claim 1, wherein said configurable table is of a flat table design configured in memory of said NP device.

4. The system according to claim 1, wherein said configurable table is of a binary tree design configured in memory of said NP device.

5. A method for distributing processing of special data frames received by a network processor (NP) device in a distributed networking environment comprising one or more general purpose control processors (GPP) that control one or more NP devices, said method comprising:

a) providing a table implemented in said NP device for mapping special data frame types received at said NP device with a target address and a target port address associated with a target GPP capable of processing said special frame type, b) receiving at said NP device a data frame of a data frame type;

c) classifying the received data frames and comparing each said frame to entries in said table; and, d) if said classified frame type has a corresponding entry in said table, forwarding said special data frame to said target GPP through a corresponding target port address, said target GPP provisioned for handling forwarding of said special data frame type, wherein step a) includes the step of: implementing an application programming interface for configuring said table with said target address and a target port address.

6. An application programming interface for configuring a network processor (NP) device operating in a distributed networking environment including one or more general purpose control processors (GPP) that control one or more NP devices, said interface comprising:

a mechanism for generating a data structure for input to said NP device, said data structure having one or more entries specifying a special frame type and associated target address and target port address associated with a GPP in said networking environment capable of handling said special frame type; and, a device for generating a customized table from said generated data structure, and inputting said customized table to an NP device memory, whereby subsequent table lookups in said table are performed for forwarding special frame types to an associated GPP through a target port address.

7. The application programming interface according to claim 6, wherein said data structure includes a string of tagged list values, each tagged list value including an attribute field representing a special frame type to be included in said table, a length field representing a length of said tagged list value, and, a value field for specifying a target associated target address and target port address for said special frame type.

8. A program storage device readable by a machine, tangibly embodying a program of instructions executable by the machine to perform method steps for configuring a network processor (NP) device operating in a distributed networking environment including one or more general purpose control processors (GPP) that control one or more NP devices, said method steps comprising:

(a) generating a data structure for input to said NP device, said data structure having one or more entries specifying a special frame type and associated target address and target port address associated with a GPP associated with said networking environment capable of handling said special frame type; and, (b) generating a customized table from said generated data structure, and inputting said table to NP device memory, whereby subsequent table lookups in said table are performed for forwarding special frame types to an associated GPP through a target port address.

9. The program storage device readable by a machine as claimed in claim 8, wherein said data structure includes a string of tagged list values, each tagged list value including an attribute field representing a special frame type to be included in said table, a length field representing a length of said tagged list value, and, a value field for specifying a target associated target address and target port address for said special frame type.

* * * * *